United States Patent
Miki et al.

(10) Patent No.: US 12,489,856 B2
(45) Date of Patent: Dec. 2, 2025

(54) INFORMATION PROCESSING APPARATUS, NON-TRANSITORY COMPUTER READABLE MEDIUM STORING PROGRAM, AND INFORMATION PROCESSING METHOD THAT SET FIXING DEVICE TO DIFFERENT STATES BASED ON PROPERTY OF IMAGE FORMING DEVICE

(71) Applicant: FUJIFILM Business Innovation Corp., Tokyo (JP)

(72) Inventors: Masayoshi Miki, Kanagawa (JP); Takaki Saiki, Kanagawa (JP); Masahito Shikata, Kanagawa (JP); Kazuhiko Narushima, Kanagawa (JP); Hidenori Horie, Kanagawa (JP); Yuji Murata, Kanagawa (JP); Koji Udagawa, Kanagawa (JP); Dai Takeshima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 465 days.

(21) Appl. No.: 17/890,273

(22) Filed: Aug. 18, 2022

(65) Prior Publication Data
US 2023/0328190 A1 Oct. 12, 2023

(30) Foreign Application Priority Data
Mar. 25, 2022 (JP) .................................. 2022-049601

(51) Int. Cl.
*H04N 1/00* (2006.01)

(52) U.S. Cl.
CPC ...... *H04N 1/00896* (2013.01); *H04N 1/00978* (2013.01); *H04N 1/00986* (2013.01); *H04N 1/00822* (2013.01)

(58) Field of Classification Search
CPC .......... H04N 1/00885–00907; H04N 1/00978; H04N 1/00986; G06K 15/4055; G06K 15/406; G06F 3/1221; G06F 3/1229; G06F 1/3284; G03G 15/5004
See application file for complete search history.

(56) References Cited

U.S. PATENT DOCUMENTS

| | | | |
|---|---|---|---|
| 8,836,963 B2 | 9/2014 | Baba et al. | |
| 9,244,402 B2 | 1/2016 | Matsuura | |
| 9,482,997 B2 | 11/2016 | Matsuura | |
| 2006/0127118 A1* | 6/2006 | Kishi | G03G 15/5004 399/88 |
| 2011/0215762 A1* | 9/2011 | Hasebe | H10N 10/13 320/134 |
| 2011/0235133 A1* | 9/2011 | Saiki | H04N 1/00904 399/88 |

(Continued)

FOREIGN PATENT DOCUMENTS

| | | |
|---|---|---|
| JP | H11194653 | 7/1999 |
| JP | 2014038194 | 2/2014 |

(Continued)

*Primary Examiner* — Nicholas Pachol
(74) *Attorney, Agent, or Firm* — JCIPRNET (57) ABSTRACT

An information processing apparatus includes a processor configured to set a state of a fixing device in a case where a state of an image forming apparatus including the fixing device transitions to a power saving state to be different depending on a property of the imaging forming apparatus.

17 Claims, 2 Drawing Sheets

(56) References Cited

U.S. PATENT DOCUMENTS

| | | | | |
|---|---|---|---|---|
| 2012/0159223 | A1* | 6/2012 | Furubayashi | G06F 1/3209 |
| | | | | 713/323 |
| 2016/0266526 | A1* | 9/2016 | Hayashi | G03G 15/5004 |
| 2018/0270381 | A1* | 9/2018 | Ikuta | H04N 1/00896 |
| 2021/0058529 | A1* | 2/2021 | Tsujimoto | H04N 1/00724 |
| 2021/0373819 | A1* | 12/2021 | Shimamura | G06F 3/1229 |
| 2022/0060588 | A1* | 2/2022 | Akiba | H04N 1/00029 |
| 2022/0269449 | A1* | 8/2022 | Terada | H04N 1/00896 |
| 2023/0221663 | A1* | 7/2023 | Kojima | G03G 15/2039 |
| | | | | 399/69 |
| 2023/0305613 | A1* | 9/2023 | Saiki | G06F 1/3215 |

FOREIGN PATENT DOCUMENTS

| | | |
|---|---|---|
| JP | 2016040635 | 3/2016 |
| JP | 2017203993 | 11/2017 |

\* cited by examiner

INFORMATION PROCESSING APPARATUS, NON-TRANSITORY COMPUTER READABLE MEDIUM STORING PROGRAM, AND INFORMATION PROCESSING METHOD THAT SET FIXING DEVICE TO DIFFERENT STATES BASED ON PROPERTY OF IMAGE FORMING DEVICE

CROSS-REFERENCE TO RELATED APPLICATIONS

This application is based on and claims priority under 35 USC 119 from Japanese Patent Application No. 2022-049601 filed Mar. 25, 2022.

BACKGROUND

(i) Technical Field

The present disclosure relates to an information processing apparatus, a non-transitory computer readable medium storing a program, and an information processing method.

(ii) Related Art

An apparatus having a power saving function has been known.

JP2017-203993A describes an apparatus that switches between a mode in which power is supplied to an image forming unit in a case where an object approaching the apparatus is detected and a mode in which power is not supplied to the image forming unit even in a case where the object approaching the apparatus is detected.

JP2016-40635A describes an apparatus that starts start-up processing of a fixing unit in advance in a case where it is detected that there is an operator at a predetermined position near an image forming apparatus.

JP1999-194653A describes an apparatus that continuously controls a fixing period to a temperature Ts as a standby state after an image forming operation is ended and then causes a mode to transition to a low power mode in a case where a standby state is continued for a predetermined time without any operation by a user. In the low power mode, control is performed such that a fixing heater is turned on or off between a temperature Tlu lower than the temperature Ts and a temperature Tll further lower than the temperature Tlu.

JP2014-38194A describes an apparatus that switches between a rapid thermal mode and a thermal storage mode.

SUMMARY

Aspects of non-limiting embodiments of the present disclosure relate to an information processing apparatus, a non-transitory computer readable medium storing a program, and an information processing method that suppress deterioration in convenience of a user who uses an image forming apparatus as compared with a case where a state of a fixing device is constantly maintained in the same state under a power saving state in a case where a state of the image forming apparatus including the fixing device transitions to the power saving state.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to set a state of a fixing device in a case where a state of an image forming apparatus including the fixing device transitions to a power saving state to be different depending on a property of the imaging forming apparatus.

BRIEF DESCRIPTION OF THE DRAWINGS

Exemplary embodiment(s) of the present invention will be described in detail based on the following figures, wherein.

DETAILED DESCRIPTION

Figure 1:
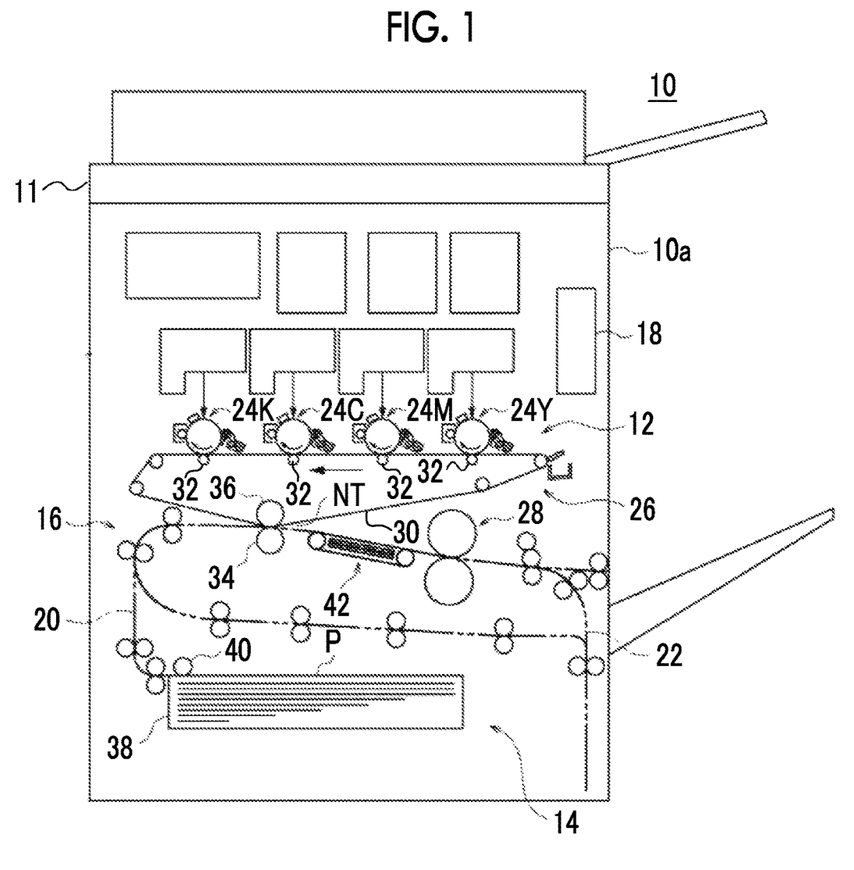
FIG. 1 is a diagram showing a structure of an image forming apparatus according to an exemplary embodiment.

A structure of an image forming apparatus according to the exemplary embodiment will be described with reference to FIG. 1. FIG. 1 shows an example of the structure of the image forming apparatus according to the exemplary embodiment.

An image forming apparatus 10 includes a reading unit 11, an image forming unit 12, a storage unit 14, a conveyance unit 16, and a control device 18.

The reading unit 11 generates image data by optically reading information on a document. The reading unit 11 may include an automatic document feeding device. The image forming unit 12 forms a toner image by, for example, an electrophotographic method. The image forming unit 12 may form a toner image based on the image data generated by the reading unit 11, or may form a toner image based on image data received from an external apparatus other than the image forming apparatus 10 (for example, an apparatus such as a personal computer or a server). The storage unit 14 stores paper P which is an example of a recording medium. The conveyance unit 16 conveys the paper P stored in the storage unit 14 toward the image forming unit 12 along a conveyance path 20. The conveyance unit 16 conveys the paper P conveyed along the conveyance path 20 along an inversion path 22 to invert the front and back of the paper P, and conveys the paper P toward the image forming unit 12 again.

The toner image formed by the image forming unit 12 is formed on a front surface of the paper P conveyed along the conveyance path 20. The paper P on which the toner image is formed is discharged to the outside of a housing 10a of the image forming apparatus 10.

In a case where the toner image is formed on a back surface of the paper P, the paper P on which the toner image is formed on the front surface is conveyed along the inversion path 22, and the toner image is formed on the back surface of the paper P again by the image forming unit 12. Thereafter, the paper P is discharged to the outside of the housing 10a. In the example shown in FIG. 1, the image forming apparatus 10 has a function of forming a toner image on both surfaces of the paper P, but have a function of forming a toner image on only one surface of the paper P.

As an example, the image forming unit 12 includes an image forming units 24Y, 24M, 24C, and 24K, a transfer unit 26, and a fixing device 28, and forms a toner image for each color. The image forming unit 24Y forms a yellow (Y) toner image by using a yellow (Y) toner. The image forming unit 24M forms a magenta (M) toner image by using a magenta (M) toner. The image forming unit 24C forms a cyan (C) toner image by using a cyan (C) toner. The image forming unit 24K forms a black (K) toner image by using a black (K) toner. The transfer unit 26 transfers the toner image formed by each of the image forming units 24Y, 24M, 24C, and 24K to the paper P. The fixing device 28 fixes the toner image transferred to the paper P by the transfer unit 26 to the paper P. In the example shown in FIG. 1, four color toners are used, but this example is merely an example, and five or more color toners may be used. For example, in addition to yellow, magenta, cyan, and black, other spot colors may be used. As another example, only a black toner may be used.

The image forming units 24Y, 24M, 24C, and 24K have basically the same configuration except for the toners to be used. For example, the image forming units 24Y, 24M, 24C, and 24K each include a rotating cylindrical image holder, a charger for charging the image holder, an exposure device, and a developing device. The exposure device irradiates a charged image holder with light to form an electrostatic latent image. The developing device develops the electrostatic latent image as the toner image with a developer containing toner.

The transfer unit 26 includes a transfer belt 30, a primary transfer roll 32, a secondary transfer roll 34, and a roll 36. The transfer belt 30 is wound around a plurality of rolls including the roll 36 and orbits in a direction of an arrow in FIG. 1. A secondary transfer unit NT (that is, a Nip unit) for transferring a toner image to the paper P is formed between the secondary transfer roll 34 and the transfer belt 30.

The fixing device 28 is arranged on a downstream side of the secondary transfer unit NT in a convey direction of the paper P.

The storage unit 14 includes a storage member 38 and a delivery roll 40. The storage member 38 stores the paper P. The delivery roll 40 delivers the paper P stored in the storage member 38 to the conveyance path 20.

The conveyance unit 16 includes a plurality of conveyance rolls and a paper conveyance device 42. The paper P fed from the storage unit 14 is conveyed along the conveyance path 20 by the plurality of conveyance rolls. The paper conveyance device 42 conveys the paper P on which the toner image is transferred while sucking the paper, and hands over the paper to the fixing device 28.

The control device 18 controls each part of the image forming apparatus 10.

According to the image forming apparatus 10, an image is formed on the paper P as will be described below.

First, in each of the image forming units 24Y, 24M, 24C, and 24K, a front surface of the image holder is charged by the charger, the front surface of the image holder is exposed by the exposure device to form the electrostatic latent image, and the electrostatic latent image is developed by the developing device. As a result, the toner image is formed on the front surface of the image holder. The toner images of the respective colors are sequentially transferred to the transfer belt 30 by the primary transfer roll 32.

The paper P is delivered from the storage member 38 to the conveyance path 20 by the delivery roll 40, and is delivered to the secondary transfer unit NT along the conveyance path 20. In the secondary transfer unit NT, the paper P is conveyed between the transfer belt 30 and the secondary transfer roll 34, so that the toner image transferred to the transfer belt 30 is transferred to the surface of the paper P.

The paper P to which the toner image is transferred is conveyed to the fixing device 28 by the paper conveyance device 42. The toner image transferred to the front surface of the paper P is fixed to the paper P by the fixing device 28. The paper P on which the toner image is fixed is discharged to the outside of the housing 10*a*.

In a case where a toner image is formed on the back surface of the paper P, the conveyance unit 16 conveys the paper P having passed through the fixing device 28 along the inversion path 22 to invert the front and back of the paper P, and conveys the paper P of which the front and back are inverted to the secondary transfer unit NT along the conveyance path 20. The toner image is transferred to the back surface of the paper P by the secondary transfer unit NT, and the toner image is fixed to the paper P by the fixing device 28. The paper P on which the toner image is fixed is discharged from the housing 10*a* to the outside.

The structure shown in FIG. 1 is merely an example, and the structure of the image forming apparatus according to the exemplary embodiment is not limited to the structure shown in FIG. 1. The image forming apparatus according to the exemplary embodiment may be a printer, a multifunction device, or the like having a structure other than the structure shown in FIG. 1.

Figure 2:
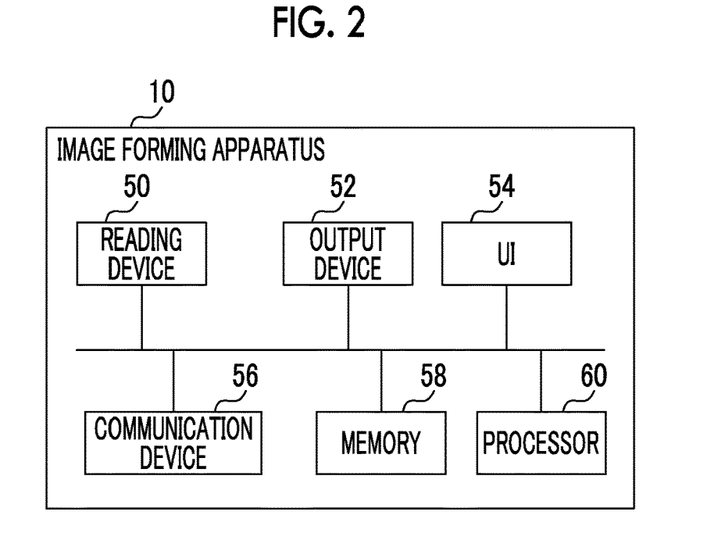
FIG. 2 is a block diagram showing the image forming apparatus according to the exemplary embodiment.

Hereinafter, a hardware configuration of the image forming apparatus 10 will be described with reference to FIG. 2. The image forming apparatus 10 includes a reading device 50, an output device 52, a UI 54, a communication device 56, a memory 58, and a processor 60.

The reading device 50 corresponds to the reading unit 11 shown in FIG. 1, and the output device 52 corresponds to the image forming unit 12 shown in FIG. 1. The memory 58 and the processor 60 are included in the control device 18. The image forming apparatus 10 or the control device 18 corresponds to an example of an information processing apparatus.

The UI 54 is a user interface and includes a display and an input device. The display is a liquid crystal display, an EL display, or the like. The input device is a keyboard, a mouse, an input key, an operation panel, or the like. The UI 54 may be a UI such as a touch panel having both a display and an input device.

The communication device 56 includes one or a plurality of communication interfaces having a communication chip, a communication circuit, and the like, and has a function of transmitting information to another apparatus and a function of receiving information from the other apparatus. The communication device 56 may have a wireless communication function such as short-range wireless communication or Wi-Fi (registered trademark), or may have a wired communication function.

The memory 58 is a device constituting one or a plurality of storage regions for storing data. The memory 58 is, for example, a hard disk drive (HDD), a solid state drive (SSD), various memories (for example, RAM, DRAM, NVRAM, ROM, and the like), other storage devices (for example, an optical disk or the like), or a combination thereof.

The processor 60 controls an operation of each part of the image forming apparatus 10.

In the present exemplary embodiment, the processor 60 sets a state of the output device 52 to be different in a case where a state of the image forming apparatus 10 transitions to a power saving state depending on a property of the image forming apparatus 10. Specifically, the processor 60 sets a state of the fixing device 28 included in the output device 52 to be different.

The property of the image forming apparatus 10 includes not only features provided in advance in the image forming apparatus 10 such as performance for raising a temperature rise of the fixing device 28, but also features exhibited by the image forming apparatus 10 under a certain condition such as the performance relating to the temperature rise of 28 in an environment where the image forming apparatus 10 is installed or a predetermined setting of the image forming apparatus 10 such as a target temperature of the fixing device 28 depending a type of paper on which an image is formed by the image forming apparatus 10.

The performance for raising the temperature of the fixing device 28 depends on a type of the fixing device 28. For example, there are "rapid thermal type" and "thermal storage type" as the type of the fixing device 28.

The rapid thermal type fixing device is a fixing device that heats a fixing member by using an induction heating (IH) technology. For example, the rapid thermal type fixing device includes a fixing member (for example, a roller or a belt) which is an object to be heated and a coil for realizing IH. The coil is installed inside or outside the fixing member. A radio frequency current is supplied to the coil, and thus, a radio frequency magnetic field is formed around the coil. An eddy current flows through a conductor due to this magnetic field, and thus, heating is performed by Joule heat. In a magnetic material, a hysteresis loss occurs and heating is performed. IH fixing is realized by such heating.

The thermal storage type fixing device is a fixing device that heats the fixing member by using a heater such as a halogen lamp without using the IH technology. The heater such as a halogen lamp is installed inside the fixing member, and fixing is performed by heating with the heater.

The rapid thermal type fixing device can heat up the fixing member to a target temperature required for fixing in a shorter time than in the thermal storage type fixing device. This time difference is due to the performance for raising the temperature of the fixing device.

The environment is a temperature at a place where the image forming apparatus 10 is installed or an ambient temperature of the image forming apparatus 10. The place herein is a concept that includes countries and regions.

A power state of the image forming apparatus 10 includes a standby state and a power saving state. In the following description, a mode of the image forming apparatus 10 in a case where the power state of the image forming apparatus 10 is the standby state is referred to as a "standby mode", and the mode of the image forming apparatus 10 in a case where the power state of the image forming apparatus 10 is the power saving state is referred to as a "power saving mode".

The standby mode is a state where the image forming apparatus 10 is on standby. Specifically, in the standby mode, power is supplied to each part of the image forming apparatus 10 and each part is operating. The state of the image forming apparatus 10 at this time is a state where the image forming apparatus 10 can accept processing (for example, a print job, a scan instruction, a copy instruction, or the like) and execute the processing.

The power saving mode is a state where power is not supplied to the image forming apparatus 10 in a part or whole or a state where power lower than power in the standby mode is supplied to the image forming apparatus 10 in a part or whole.

For example, in a case where the mode of the image forming apparatus 10 is the standby mode and a user operates the UI 54 to give an instruction about the power saving mode (for example, in a case where a power saving button is pressed), the processor 60 changes the mode of the image forming apparatus 10 from the standby mode to the power saving mode.

As another example, a time during which the mode transitions from the standby mode to the power saving mode (hereinafter, referred to as a "transition time") may be set. A value of the transition time is stored in the memory 58. In a case where the mode of the image forming apparatus 10 is the standby mode and a time during which the image forming apparatus 10 does not perform processing such as a print job or a time during which the UI 54 is not operated by the user is equal to or greater than the transition time, the processor 60 changes the mode of the image forming apparatus 10 from the standby mode to the power saving mode.

In a case where the mode of the image forming apparatus 10 is the power saving mode and a specific event occurs, the processor 60 returns each part of the image forming apparatus 10 from the power saving mode to the standby mode. A state where the mode returns to the standby mode is a state where each device or each part constituting the image forming apparatus 10 can execute processing or a function such as a print job. The state where the mode returns to the standby mode means that the state of each part constituting the image forming apparatus 10 transitions from the state in the power saving mode to the state where processing and functions can be executed. The specific event is an event corresponding to the instruction about returning. For example, in a case where the return button is provided on the operation panel and the user presses the return button, the processor 60 determines that the specific event occurs and changes the mode of the image forming apparatus 10 from the power saving mode to the standby mode. In a case where the device is powered off in the power saving mode, the device is powered on by the processor 60. In a case where the power supplied to the device is lower than the power in the standby mode, the processor 60 supplies the power in the standby mode to the device. In a case where the print job is transmitted from an external apparatus to the image forming apparatus 10 and the processor 60 accepts the print job, the processor 60 determines that the specific event occurs and changes the mode of the image forming apparatus 10 from the power saving mode to the standby mode. The specific event described herein is merely an example of the event that causes the return, and other events may be set as the event that causes the return.

A plurality of different modes are set as the power saving mode, and the processor 60 may stepwisely change the power saving mode of the image forming apparatus 10. For example, a first power saving mode and a second power saving mode are set. The second power saving mode is a mode in which power consumption is less than in the first power saving mode.

For example, the first power saving mode and the second power saving mode are set in consideration of an energy saving effect and the return time. The return time is a time required for each part of the image forming apparatus 10 to return from the power saving mode to the standby mode. That is, the return time is a time required for the state of each device or each part constituting the image forming apparatus 10 to change from the state in the power saving mode to the state where processing and functions can be executed. The return time may be set to be different for each device or each part constituting the image forming apparatus 10. For example, a return time of a device or a part, such as the reading device 50 or an operation panel that functions immediately in a case where power is supplied is relatively short. On the other hand, a return time of a device or a part such as a fixing device that functions after a certain amount of time elapses since the supply of the power is stated is relatively long. In a case where the fixing device is described as an example, since it is necessary to raise a temperature of the fixing device to a target temperature required for fixing, the transition time becomes long by time required for the temperature rise. In general, in a case where the fixing device is powered off once, it takes a long time until actual printing can be performed from the state where the fixing device is powered off.

The return time corresponds to a time while the user is waiting for the state of the image forming apparatus 10 to transition from the power saving mode to the standby mode. Thus, the return time can be expressed as a standby time for the user.

In a case where a plurality of different modes are set as the power saving mode, the transition time is set for each power saving mode. For example, a first transition time which is a transition time from the standby mode to the first power saving mode and a second transition time which is a transition from the first power saving mode to the second power saving mode are set.

In a case where the mode of the image forming apparatus 10 is the standby mode and a time during which the processing is not performed by the image forming apparatus 10 or a time during which the UI 54 is not operated by the user is equal to or greater than the first transition time, the processor 60 changes the mode of the image forming apparatus 10 from the standby mode to the first power saving mode. That is, in a case where the first transition time elapses from the point in time at which the apparatus performs processing last or is operated last, the processor 60 changes the mode of the image forming apparatus 10 from the standby mode to the first power saving mode. In a case where the mode of the image forming apparatus 10 is the first power saving mode and the specific event causing the return occurs, the processor 60 changes the mode of the image forming apparatus 10 from the first power saving mode to the standby mode.

In a case where the mode of the image forming apparatus 10 is the first power saving mode and the time during which the image forming apparatus 10 does not perform processing or the time during which the UI 54 is not operated by the user is equal to or greater than the second transition time, the processor 60 changes the mode of the image forming apparatus 10 from the first power saving mode to the second power saving mode. That is, in a case where the second transition time elapses without any processing or operation from a point in time at which the mode transitions to the first power saving mode, the processor 60 changes the mode of the image forming apparatus 10 from the first power saving mode to the second power saving mode. In a case where the mode of the image forming apparatus 10 is the second power saving mode and the specific event causing the return occurs, the processor 60 changes the mode of the image forming apparatus 10 from the second power saving mode to the standby mode.

The first power saving mode and the second power saving mode are merely examples, and three or more different power saving modes may be set and the power saving modes may be stepwisely changed.

A case where the state of the output device 52 is set to be different depending on the property of the image forming apparatus 10 means a case where a temperature state of the fixing device 28 is set to be different depending on the property of the image forming apparatus 10. For example, the control of the power supply to the fixing device 28 is set to be different depending on the property of the image forming apparatus 10, and thus, the temperature state of the fixing device 28 is set to be different depending on the property of the image forming apparatus 10.

Figure 3:
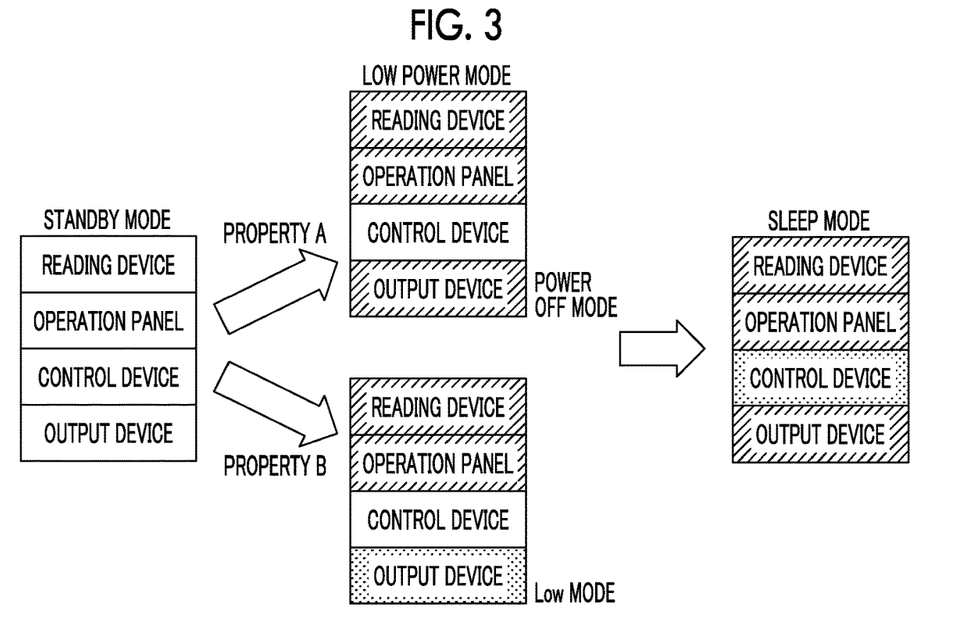
FIG. 3 is a diagram showing each mode of the image forming apparatus.

Hereinafter, an example of each mode of the image forming apparatus 10 will be described with reference to FIG. 3. FIG. 3 shows an example of each mode.

For example, the mode of the image forming apparatus 10 includes the standby mode, the low power mode, and the sleep mode. As described above, the standby mode is a mode in which power is supplied to each part of the image forming apparatus 10. The low power mode and the sleep mode are examples of the power saving mode. The low power mode is an example of the first power saving mode, and the sleep mode is an example of the second power saving mode. The sleep mode is a mode in which power consumption is less than in the low power mode.

Hereinafter, a specific example of each mode will be described. In the following description, each mode will be described as an example, focusing on the supply of power to each of the reading device 50, the operation panel constituting the UI 54, the control device 18, and the output device 52.

In the standby mode, power is supplied to each part of the image forming apparatus 10, and each part is operating. Specifically, power is supplied to the reading device 50, the operation panel, the control device 18, and the output device 52, and these devices are operating.

In the low power mode, at least the reading device 50 and the operation panel are in the power saving state. Specifically, the reading device 50 and the operation panel are powered off, and power is not supplied to the reading device 50 and the operation panel. For example, in a case where the operation panel has a backlight, that backlight is turned off.

The low power mode includes a power off mode and a Low mode. In both the power off mode and the Low mode, the state of the reading device 50 and the operation panel transitions to the power saving state.

The power off mode is a mode in which the output device 52, more specifically, the fixing device 28 included in the output device 52 is powered off. The power off mode corresponds to an example of first processing.

The Low mode is a mode in which power for maintaining a temperature of the fixing device 28 within a predetermined temperature range is supplied to the output device 52 without powering off the output device 52. The predetermined temperature range is a temperature range lower than the temperature of the fixing device 28 during printing (that is, a target temperature required for fixing), and is a range of a temperature higher than the temperature of the fixing device 28 before the fixing device 28 is heated in a state where the fixing device 28 is powered off. The predetermined temperature range may be a constant temperature. The Low mode corresponds to an example of second processing.

The temperature of the fixing device 28 is lowered to a temperature lower than the target temperature required for fixing, and thus, the power consumption of the fixing device 28 is reduced. Unless there are special circumstances such as returning to the standby mode immediately after the mode of the image forming apparatus 10 transitions to the power off mode, the temperature of the fixing device 28 after the mode transitions to the power off mode is lower than the temperature of the fixing device 28 after the mode transitions to the Low mode. In other words, in the Low mode, the temperature of the fixing device 28 does not further decrease than in the power off mode. Thus, in the Low mode, the return time of the fixing device 28 is shorter than the return time in the power off mode. As described above, in the Low mode, both the reduction in the power consumption of the fixing device 28 and the reduction in the return time of the fixing device 28 are realized.

The power off mode and the Low mode described above are merely examples. In a case where there is a difference in power consumption between these two modes, the fixing device 28 may not be powered off in the power off mode. For example, in the power off mode, power may be supplied to the fixing device 28 such that the temperature of the fixing device 28 is lower than the temperature of the fixing device 28 in the Low mode.

In the sleep mode, the reading device 50, the operation panel, and the output device 52 are in a power saving state. Specifically, the reading device 50, the operation panel, and the output device 52 are powered off, and power is not supplied to the reading device 50, the operation panel, and the output device 52.

In the sleep mode, the control device 18 is in the power saving state. For example, a state where a clock of the processor 60 included in the control device 18 is turned off, a state where the supply of power to the processor 60 is stopped, or a state where the supply of power to parts other than the memory 58 included in the control device 18 is stopped is an example of the power saving state of the control device 18. These states are merely examples of the sleep mode, and in a case where the power consumption in the sleep mode is lower than the power consumption in the low power mode, another power control may be performed.

The transition time is set for each power saving mode. For example, the first transition time which is the time during which the mode transitions from the standby mode to the low power mode, and the second transition time which is the time during which the mode transitions from the low power mode to the sleep mode are set. A value of the first transition time and a value of the second transition time are stored in the memory 58.

In a case where the mode of the image forming apparatus 10 is the standby mode and the time during which the processing is not performed by the image forming apparatus 10 or the time during which the UI 54 is not operated by the user is equal to or greater than the first transition time, the processor 60 changes the mode of the image forming apparatus 10 from the standby mode to the low power mode. That is, in a case where the first transition time elapses since the point in time at which the apparatus performs processing last or is operated last, the processor 60 changes the mode of the image forming apparatus 10 from the standby mode to the low power mode. In this case, the processor 60 changes the mode of the image forming apparatus 10 from the standby mode to either the power off mode or the Low mode depending on the property of the image forming apparatus 10. The processor 60 changes the mode of the image forming apparatus 10 to the power off mode in a case where the property of the image forming apparatus 10 is a property A, and changes the mode of the image forming apparatus 10 to the Low mode in a case where the property of the image forming apparatus 10 is a property B. This control will be described in detail later.

In a case where the mode of the image forming apparatus 10 is the low power mode and the specific event causing the return occurs, the processor 60 changes the mode of the image forming apparatus 10 from the low power mode to the standby mode.

In a case where the mode of the image forming apparatus 10 is the low power mode and the time during which the processing is not performed by the image forming apparatus 10 or the time during which the UI 54 is not operated by the user is equal to or greater than the second transition time, the processor 60 changes the mode of the image forming apparatus 10 from the low power mode to the sleep mode. That is, in a case where the second transition time elapses without any processing or operation from a point in time at which the mode transitions to the first power saving mode, the processor 60 changes the mode of the image forming apparatus 10 from the first power saving mode to the second power saving mode. In a case where the mode of the image forming apparatus 10 is the sleep mode and the specific event causing the return occurs, the processor 60 changes the mode of the image forming apparatus 10 from the sleep mode to the standby mode.

Figure 4:
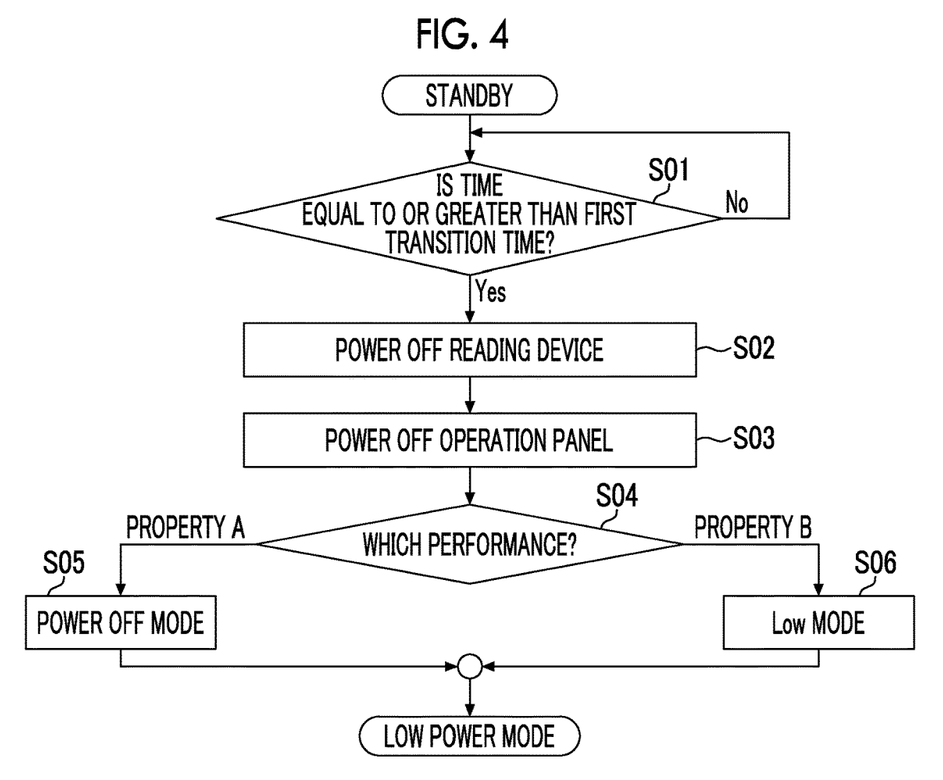
FIG. 4 is a flowchart showing a flow of processing in a case where a mode transitions to a low power mode.

Hereinafter, processing related to the transition from the standby mode to the low power mode will be described with reference to FIG. 4. FIG. 4 shows a flowchart showing a flow of the processing.

In a case where the mode of the image forming apparatus 10 is the standby mode and the time during which the processing is not performed by the image forming apparatus 10 or the time during which the image forming apparatus 10 is not operated by the user is equal to or greater than the first transition time (S01, Yes), the processor 60 changes the mode of the image forming apparatus 10 from the standby mode to the low power mode. Specifically, the processor 60 powers off the reading device 50 (S02) and powers off the operation panel (S03). In a case where the time during which the processing is not performed or the time during which the operation is not performed is less than the first transition time (S01, No), the standby mode is maintained.

The processor 60 determines whether or not the property of the image forming apparatus 10 is either the property A or the property B (S04).

In a case where the property of the image forming apparatus 10 is the property A (S04, property A), the processor 60 changes the mode of the image forming apparatus 10 to the power off mode (S05). In this case, the processor 60 powers off the output device 52.

In a case where the property of the image forming apparatus 10 is the property B (S04, property B), the processor 60 changes the mode of the image forming apparatus 10 to the Low mode (S06). In this case, the processor 60 supplies power to the fixing device 28 such that the temperature of the fixing device 28 is included in a predetermined temperature range without powering off the output device 52.

The processing of steps S04 to S06 corresponds to an example of processing of setting the state of the fixing device 28 to be different depending on the property of the image forming apparatus 10.

Hereinafter, examples of the processing from step S04 to step S06 will be described.

Example 1: Type of Fixing Device 28

In Example 1, the property of the image forming apparatus 10 is the performance for raising the temperature of the fixing device 28, that is, the type of the fixing device 28.

In a case where the fixing device 28 is a rapid thermal type fixing device, the property of the image forming apparatus 10 is the property A. In this case, the processor 60 changes the mode of the image forming apparatus 10 to the power off mode.

In a case where the fixing device 28 is the thermal storage type fixing device, the property of the image forming apparatus 10 is the property B. In this case, the processor 60 changes the mode of the image forming apparatus 10 to the Low mode.

There is a difference in the performance for raising the temperature of the fixing device between the rapid thermal type fixing device and the thermal storage type fixing device. The processor 60 sets the state of the fixing device 28 in the low power mode to be different by changing the mode of the image forming apparatus 10 to either the power off mode or the Low mode depending on the performance for raising the temperature of the fixing device 28.

In general, in a case where the fixing device 28 is the rapid thermal type fixing device, a difference between the return time from the power off mode to the standby mode and the return time from the Low mode to the standby mode is small. Although the difference depends on the specific configuration of the image forming apparatus 10, the difference is generally 1 to 2 seconds. Thus, in a case where the fixing device 28 is the rapid thermal type fixing device, even though the mode of the image forming apparatus 10 is changed to the power off mode instead of the Low mode, there is no large difference in the return time as compared to a case where the mode is changed to the Low mode. The power consumption is further reduced than in the case where the mode of the image forming apparatus 10 is changed to the Low mode. As described above, both the reduction in the return time and the energy saving are realized.

A case where the state of the fixing device 28 in the low power mode is set to be different between the rapid thermal type and the thermal storage type is equivalent to a case where the state of the fixing device 28 in the power mode is set to be different depending on a length of a time required for the temperature of the fixing device 28 to rise to a predetermined target temperature. The target temperature is a temperature required for fixing. The rapid thermal type fixing device has the performance for raising the temperature of the fixing device to the target temperature in a shorter time than in the thermal storage type fixing device. That is, in the rapid thermal type fixing device, the time required for the temperature of the fixing device to rise to the target temperature is short, and in the thermal storage type fixing device, the time required for the temperature of the fixing device to rise to the target temperature is long. Focusing on this time difference, in a case where the fixing device 28 is the rapid thermal type fixing device, the mode is changed to the power off mode, and in a case where the fixing device 28 is the thermal storage type fixing device, the mode is changed to the Low mode.

Whenever the fixing device 28 is powered on, the processor 60 may measure a length of a time until a point in time at which the temperature of the fixing device 28 reaches the target temperature from a point in time at which the fixing device 28 is powered on (that is, the return time of the fixing device 28). The point in time at which the fixing device 28 is powered on is a point in time at which the fixing device 28 is powered on in a case where the mode returns from the power off mode or the sleep mode to the standby mode, or a point in time at which the image forming apparatus 10 is powered on.

In a case where the mode of the image forming apparatus 10 is changed from the standby mode to the low power mode and the measured length of the return time of the fixing device 28 is equal to or less than a threshold value, the processor 60 changes the mode of the image forming apparatus 10 to the power off mode. In a case where the measured length of the return time of the fixing device 28 exceeds the threshold value, the processor 60 changes the mode of the image forming apparatus 10 to the Low mode. As the length of the return time, a length of the return time measured at the time of the previous return may be used, or an average value of lengths of a plurality of return times may be used.

Example 2: Environment where Image Forming Apparatus 10 is Installed

In Example 2, the property of the image forming apparatus is the performance for raising the temperature of the fixing device 28 in the environment where the image forming apparatus 10 is installed.

The environment is a temperature at a place where the image forming apparatus 10 is installed or an ambient temperature of the image forming apparatus 10. The ambient temperature of the image forming apparatus 10 may change depending on the place where the image forming apparatus 10 is installed. For example, there is a difference in the ambient temperature of the image forming apparatus 10 between a cold region and a warm region.

The time required to raise the temperature of the fixing device 28 to the target temperature may change depending on the ambient temperature of the image forming apparatus 10. For example, as the ambient temperature becomes lower, it takes a longer time for the temperature of the fixing device 28 to rise to the target temperature.

For example, the processor 60 acquires positional information of the image forming apparatus 10 by using the Global Positioning System (GPS), and specifies the place where the image forming apparatus 10 is installed based on the positional information. Information indicating the place where the image forming apparatus 10 is installed is input to the image forming apparatus 10 via the UI 54 or the like, and the processor 60 may specify the place where the image forming apparatus 10 is installed based on the input information. The processor 60 may acquire information from an external apparatus (for example, a management server) that remotely manages an apparatus such as the image forming apparatus 10. For example, the management server stores contract information (for example, information indicating a contract that defines rules for using the image forming apparatus 10), management information (for example, information regarding management of each part and consumables of the image forming apparatus 10), and the like. The processor 60 may acquire information obtained from the contract information, the management information, and the like from the management server by communication. For example, in a case where the contract information or the management information includes the information indicating the place where the image forming apparatus 10 is installed, the processor 60 acquires the information indicating the place from the management server. The processor 60 may acquire environmental information such as temperature and humidity in the environment where the image forming apparatus 10 is installed from the management server. The user may select the place, and the processor 60 may specify the selected place as the place where the image forming apparatus 10 is installed. As the selection of the place, for example, the selection on a country basis or a region basis can be considered. Of course, the place where the image forming apparatus 10 is installed may be specified by selecting a finer place range.

A temperature sensor for measuring the ambient temperature of the image forming apparatus 10 is installed in the image forming apparatus 10, and the temperature sensor measures the ambient temperature of the image forming apparatus 10. The processor 60 may acquire information indicating the temperature of the place where the image forming apparatus 10 is installed via the Internet or the like, and may use the temperature as the ambient temperature of the image forming apparatus 10.

In a case where the mode of the image forming apparatus 10 transitions from the standby mode to the low power mode and the ambient temperature of the image forming apparatus 10 is equal to or higher than the threshold value, the processor 60 changes the mode of the image forming apparatus 10 to the power off mode. In a case where the ambient temperature of the image forming apparatus 10 is lower than the threshold value, the processor 60 changes the mode of the image forming apparatus 10 to the Low mode. In a case where the ambient temperature of the image forming apparatus 10 is equal to or higher than the threshold value, it is presumed that the time required for the temperature of the fixing device 28 to rise to the target temperature is shorter than in a case where the ambient temperature is lower than the threshold value. That is, it is presumed that the return time of the fixing device 28 is shorter. Thus, the mode can be changed to the power off mode in which power consumption is less. On the other hand, in a case where the ambient temperature of the image forming apparatus 10 is lower than the threshold value, it is presumed that the return time of the fixing device 28 is longer. Thus, the mode can be changed to the Low mode.

In the case where the mode of the image forming apparatus 10 transitions from the standby mode to the low power mode and the place where the image forming apparatus 10 is installed is included in a range of a predetermined place, the processor 60 changes the mode of the image forming apparatus 10 to the power off mode. In a case where the place where the image forming apparatus 10 is installed is not included in the range of the predetermined place, the processor 60 changes the mode of the image forming apparatus 10 to the Low mode. The range of the predetermined place is a range of a place where it is presumed that the ambient temperature of the image forming apparatus 10 is equal to or higher than the threshold value. In a case where the image forming apparatus 10 is installed in the place where it is presumed that the ambient temperature of the image forming apparatus 10 is equal to or higher than the threshold value, it is presumed that the return time of the fixing device 28 is shorter than in a case where the image forming apparatus 10 is installed in the place where it is presumed that the ambient temperature is lower than the threshold value. Thus, the mode can be changed to the power off mode in which power consumption is less. On the other hand, in a case where the image forming apparatus 10 is installed at a place where it is presumed that the ambient temperature of the image forming apparatus 10 is lower than the threshold value, it is presumed that the return time of the fixing device 28 is longer. Thus, the mode can be changed to the Low mode.

Example 3: Type of Paper P

In Example 3, the property of the image forming apparatus 10 is the target temperature of the fixing device 28 corresponding to the type of the paper P on which the image is formed.

The processor 60 sets the state of the fixing device 28 in a case where the mode of the image forming apparatus 10 transitions to the low power mode to be different depending on the target temperature of the fixing device 28 corresponding to the type of the paper P.

The target temperature of the fixing device 28, that is, the temperature required for fixing may be different depending on the type of the paper P. For example, a target temperature for a thick paper P is higher than a target temperature for a thin paper P. That is, it is presumed that as the thickness of the thicker the paper P, becomes thicker, the temperature required for fixing (that is, the target temperature) becomes higher.

In Example 3, in a case where the mode of the image forming apparatus 10 transitions from the standby mode to the low power mode and the thickness of the paper P is equal to or greater than a threshold value, the processor 60 changes the mode of the image forming apparatus 10 to the Low mode. In a case where the thickness of the paper P is less than the threshold value, the processor 60 changes the mode of the image forming apparatus 10 to the power off mode. In a case where the thickness of the paper P is equal to or greater than the threshold value, since the target temperature is higher than in a case where the thickness of the paper P is smaller than the threshold value, the mode is changed to the Low mode in order to shorten the return time from the low power mode to the standby mode. In a case where the thickness of the paper P is less than the threshold value, since the target temperature is lower than in a case where the thickness of the paper P is equal to or greater than the threshold value, the mode is changed to the power off mode in order to reduce the power consumption.

OTHER EXAMPLES

The processor 60 may set the state of the fixing device 28 in a case where the mode of the image forming apparatus 10 transitions to the low power mode to be different depending on a time zone. For example, in a case where a current time is included in a predetermined time zone (for example, from 9:00 to 18:00), the processor 60 changes the mode of the image forming apparatus 10 to the Low mode in the low power mode. In a case where the current time is not included in the predetermined time zone, the processor 60 changes the mode of the image forming apparatus 10 to the power off mode in the low power mode. As the predetermined time zone, for example, a time zone in which the image forming apparatus 10 is assumed to be used is set.

The processor 60 may set the state of the fixing device 28 in a case where the mode of the image forming apparatus 10 transitions to the low power mode to be different depending on the configuration of the image forming apparatus 10. For example, in a case where the image forming apparatus 10 includes an apparatus for performing binding processing or a post-processing apparatus such as a stapler, the processor 60 changes the mode to the Low mode. In a case where the post-processing apparatus is not included in the image forming apparatus 10, the processor 60 changes the mode to the power off mode.

In a case where a motion sensor is installed in the image forming apparatus 10, the processor 60 may control a timing at which the fixing device 28 is powered on at the time of returning to the standby mode based on the detection result of the motion sensor.

For example, in a case where the fixing device 28 is the thermal storage type fixing device and the mode of the image forming apparatus 10 is the power off mode, in a case where the motion sensor detects a person, the processor 60 changes the mode of the image forming apparatus 10 from the power off mode to the standby mode. In a case where the fixing device 28 is described as an example, the processor 60 powers on the fixing device 28. In a case where the fixing device 28 is the thermal storage type fixing device, since the return time is relatively long, the processor 60 returns the fixing device 28 at a stage at which the motion sensor detects the person. Similarly, in a case where the fixing device 28 is the thermal storage type fixing device and the mode of the image forming apparatus 10 is the Low mode, in a case where the motion sensor detects the person, the processor 60 changes the mode of the image forming apparatus 10 from the Low mode to the standby mode. In a case where the fixing device 28 is described as an example, the processor 60 increases the power supplied to the fixing device 28 such that the temperature of the fixing device 28 reaches the target temperature (that is, the temperature required for fixing).

In a case where the fixing device 28 is the rapid thermal type fixing device and the mode of the image forming apparatus 10 is the power off mode, in a case where the motion sensor detects the person, the processor 60 powers on the operation panel and does not power on the fixing device 28. In this case, in a case where the operation panel is operated by the user, the processor 60 powers on the fixing device 28. In a case where the fixing device 28 is the rapid thermal type fixing device, the return time is relatively short. Thus, the processor 60 does not power on the fixing device 28 at the stage at which the motion sensor detects the person, and powers on the fixing device 28 at a stage at which it is presumed that the user actually uses the image forming apparatus 10 (that is, at a stage at which the operation panel is operated by the user).

The function of the image forming apparatus 10 is realized by the cooperation of hardware and software as an example. For example, the processor realizes the function of each apparatus by reading out and executing a program stored in the memory of each apparatus. The program is stored in the memory via a recording medium such as a CD or DVD, or via a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
in a case where a state of an image forming apparatus including a fixing device transitions to a power saving state, determine whether a property of the image forming apparatus is a first property or a second property different from the first property,
wherein in a case where the property of the image forming apparatus is a type of paper,
the first property is a first type of paper which thickness is less than a threshold value, and
the second property is a second type of paper which thickness is equal to or greater than the threshold value;
in a case where the property of the image forming apparatus is the first property, set a state of the fixing device to be in a first mode; and
in a case where the property of the image forming apparatus is the second property, set the state of the fixing device to be in a second mode different from the first mode.

2. The information processing apparatus according to claim 1, wherein the processor is configured to:
execute first processing of powering off the fixing device or second processing of lowering a temperature of the fixing device without powering off the fixing device depending on the property of the image forming apparatus in a case where the state of the image forming apparatus transitions to the power saving state.

3. The information processing apparatus according to claim 2,
wherein in a case where the property of the image forming apparatus is performance for raising a temperature of the fixing device,
the processor is configured to:
set the state of the fixing device in a case where the state of the image forming apparatus transitions to the power saving state to be different depending on the performance for raising the temperature of the fixing device.

4. The information processing apparatus according to claim 2,
wherein in a case where the property of the image forming apparatus is performance relating to a rise in a temperature of the fixing device,
the processor is configured to:
set the state of the fixing device in a case where the state of the image forming apparatus transitions to the power saving state to be different depending on a length of a time required for the temperature of the fixing device to rise to a predetermined temperature.

5. The information processing apparatus according to claim 2,
wherein in a case where the property of the image forming apparatus is performance relating to a rise in a temperature of the fixing device in an environment where the image forming apparatus is installed, and
the processor is configured to:
set the state of the fixing device in a case where the state of the image forming apparatus transitions to the power saving state to be different depending on the performance relating to the rise in the temperature of the fixing device in an environment where the image forming apparatus is installed.

6. The information processing apparatus according to claim 5,
wherein the environment is a place where the image forming apparatus is installed.

7. The information processing apparatus according to claim 5,
wherein the environment is an ambient temperature of the image forming apparatus.

8. The information processing apparatus according to claim 2,
wherein
the processor is configured to:
set the state of the fixing device in a case where the state of the image forming apparatus transitions to the power saving state to be different depending on the target temperature of the fixing device corresponding to the type of the paper on which the image is formed by the image forming apparatus.

9. The information processing apparatus according to claim 1,
wherein in a case where the property of the image forming apparatus is performance for raising a temperature of the fixing device,
the processor is configured to:
set the state of the fixing device in a case where the state of the image forming apparatus transitions to the power saving state to be different depending on the performance for raising the temperature of the fixing device.

10. The information processing apparatus according to claim 1,
wherein in a case where the property of the image forming apparatus is performance relating to a rise in a temperature of the fixing device,
the processor is configured to:
set the state of the fixing device in a case where the state of the image forming apparatus transitions to the power saving state to be different depending on a length of a time required for the temperature of the fixing device to rise to a predetermined temperature.

11. The information processing apparatus according to claim 1,
wherein in a case where the property of the image forming apparatus is performance relating to a rise in a temperature of the fixing device in an environment where the image forming apparatus is installed,
the processor is configured to:
set the state of the fixing device in a case where the state of the image forming apparatus transitions to the power saving state to be different depending on the performance relating to the rise in the temperature of the fixing device in an environment where the image forming apparatus is installed.

12. The information processing apparatus according to claim 11,
wherein the environment is a place where the image forming apparatus is installed.

13. The information processing apparatus according to claim 11,
wherein the environment is an ambient temperature of the image forming apparatus.

14. The information processing apparatus according to claim 1,
wherein
the processor is configured to:
set the state of the fixing device in a case where the state of the image forming apparatus transitions to the power saving state to be different depending on the target temperature of the fixing device corresponding to the type of the paper on which the image is formed by the image forming apparatus.

15. The information processing apparatus according to claim 1,
wherein in a case where the property of the image forming apparatus is the type of paper being the first type, set the state of the fixing device to be in a power off mode, and
wherein in a case where the property of the image forming apparatus is the type of paper being the second type, set the state of the fixing device to be in a low power mode.

16. A non-transitory computer readable medium storing a program causing a computer to execute a process, the processing comprising:
in a case where a state of an image forming apparatus including a fixing device transitions to a power saving state, determining whether a property of the image forming apparatus is a first property or a second property different from the first property,
wherein in a case where the property of the image forming apparatus is a type of paper,
the first property is a first type of paper which thickness is less than a threshold value, and
the second property is a second type of paper which thickness is equal to or greater than the threshold value;
in a case where the property of the image forming apparatus is the first property, setting a state of the fixing device to be in a first mode; and
in a case where the property of the image forming apparatus is the second property, setting the state of the fixing device to be in a second mode different from the first mode.

17. An information processing method comprising:
in a case where a state of an image forming apparatus including a fixing device transitions to a power saving state, determining whether a property of the image forming apparatus is a first property or a second property different from the first property,
wherein in a case where the property of the image forming apparatus is a type of paper,
the first property is a first type of paper which thickness is less than a threshold value, and
the second property is a second type of paper which thickness is equal to or greater than the threshold value;
in a case where the property of the image forming apparatus is the first property, setting a state of the fixing device to be in a first mode; and
in a case where the property of the image forming apparatus is the second property, setting the state of the fixing device to be in a second mode different from the first mode.

* * * * *